United States Patent
Jang et al.

(10) Patent No.: US 8,247,073 B2
(45) Date of Patent: Aug. 21, 2012

(54) CORE-SHELL NANOCRYSTAL COMPRISING A NON-SEMICONDUCTOR BUFFER LAYER, METHOD FOR PREPARING THE SAME AND ELECTRONIC DEVICE COMPRISING THE SAME

(75) Inventors: Eun Joo Jang, Suwon-si (KR); Shin Ae Jun, Seongnam-si (KR); Jung Eun Lim, Yongin-si (KR); Yong Nam Ham, Ansan-si (KR)

(73) Assignee: Samsung Electronics Co., Ltd. (KR)

( * ) Notice: Subject to any disclaimer, the term of this patent is extended or adjusted under 35 U.S.C. 154(b) by 1078 days.

(21) Appl. No.: 11/970,723

(22) Filed: Jan. 8, 2008

(65) Prior Publication Data

US 2008/0268248 A1      Oct. 30, 2008

(30) Foreign Application Priority Data

Apr. 26, 2007   (KR) .................. 10-2007-0040803

(51) Int. Cl.
*B32B 5/16* (2006.01)
*B05D 7/00* (2006.01)

(52) U.S. Cl. ......... 428/403; 427/212; 427/215; 977/813

(58) Field of Classification Search .......... 428/403–407; 427/212, 215, 221; 977/813
See application file for complete search history.

(56) References Cited

U.S. PATENT DOCUMENTS

| | | | | |
|---|---|---|---|---|
| 5,474,591 A * | 12/1995 | Wells et al. | ...... | 75/351 |
| 5,751,018 A * | 5/1998 | Alivisatos et al. | ...... | 257/64 |
| 6,251,303 B1 * | 6/2001 | Bawendi et al. | ...... | 252/301.4 R |
| 6,815,064 B2 * | 11/2004 | Treadway et al. | ...... | 428/403 |
| 6,906,339 B2 * | 6/2005 | Dutta | ...... | 257/40 |
| 6,927,069 B2 * | 8/2005 | Weiss et al. | ...... | 436/518 |
| 7,101,718 B2 * | 9/2006 | Weiss et al. | ...... | 436/524 |
| 7,105,051 B2 | 9/2006 | Peng et al. | | |
| 7,193,098 B1 * | 3/2007 | Lucey et al. | ...... | 556/1 |
| 7,253,119 B2 * | 8/2007 | Dutta | ...... | 438/754 |
| 7,309,525 B2 * | 12/2007 | Reiss et al. | ...... | 428/403 |
| 7,405,002 B2 * | 7/2008 | Ying et al. | ...... | 428/404 |
| 7,834,468 B2 * | 11/2010 | Dutta | ...... | 257/788 |
| 2004/0151898 A1 | 8/2004 | Reiss et al. | | |
| 2005/0266246 A1 * | 12/2005 | Reiss et al. | ...... | 428/403 |
| 2006/0029802 A1 * | 2/2006 | Ying et al. | ...... | 428/403 |
| 2007/0034833 A1 | 2/2007 | Parce et al. | | |
| 2007/0049765 A1 | 3/2007 | Lucey et al. | | |

OTHER PUBLICATIONS

Matteo Amelia, Shell Engineering for Tunable Emission in Type II and Doped Colloidal Semiconductor Nanocrystals, 2006.*
"Water-soluble quantum dots for biomedical applications"; Authors: William W. Yu, et al.; Biochemical and Biophysical Research Communications 348 (2006) 781-786.
"Quantum Dot Bioconjugates for Ultrasensitive Nonisotopic Detection"; Authors: Warren C.W. Chan, et al.; www.sciencemag.org; Sep. 25, 1998, vol. 281.
"Functional InP Nanocrystals as Novel Near-infrared Flourescent Sensors for Mercury Ions"; Authors: Changqing Zhu, et al.; Chemistry Letters vol. 34, No. 7 (2005).
"Fluorescence Intermittency in Single InP Quantum Dots"; Masaru Kuno, et al.; NANO Letters 2001, vol. 1, No. 10 pp. 557-564.

(Continued)

Primary Examiner — Hoa (Holly) Le
(74) Attorney, Agent, or Firm — Cantor Colburn LLP (57) ABSTRACT

Disclosed herein are a nanocrystal, a method for preparing the nanocrystal, and an electronic device comprising the nanocrystal. The nanocrystal comprises a semiconductor nanocrystal core, a non-semiconductor buffer layer surrounding the semiconductor nanocrystal core, and a shell surrounding the buffer layer.

19 Claims, 6 Drawing Sheets

OTHER PUBLICATIONS

"Solution routes to III-V semiconductor quantum dots"; Authors: Mark Green; Current Opinion in Solid State and Materials Science 6 (2002) 355-363.

"Folate-Receptor-Mediated Delivery of InP Quantum Dots for Bioimaging Using Confocal and Two-Photon Microscopy"; Authors: Dhruba J. Bharali, et al.; J.Am. Chem.Soc. 2005, 127, 11364-11371.

European Search Report dated Aug. 22, 2008, Received Aug. 26, 2008; Reference: RZ/P40803EP.

Korean Office Action and English translation for Korean Patent Application No. 10-2007-40803 dated May 31, 2008.

* cited by examiner

CORE-SHELL NANOCRYSTAL COMPRISING A NON-SEMICONDUCTOR BUFFER LAYER, METHOD FOR PREPARING THE SAME AND ELECTRONIC DEVICE COMPRISING THE SAME

CROSS-REFERENCE TO RELATED PATENT APPLICATION

This non-provisional application claims priority under 35 U.S.C. §119(a) to Korean Patent Application No. 10-2007-0040803 filed on Apr. 26, 2007, the disclosure of which is incorporated herein in its entirety by reference.

BACKGROUND

1. Field of the Invention

The present disclosure relates to a nanocrystal, a method for preparing the nanocrystal, and an electronic device comprising the nanocrystal. More specifically, the present disclosure relates to a nanocrystal comprising a semiconductor nanocrystal core, a non-semiconductor buffer layer surrounding the nanocrystal core, and a shell layer surrounding the buffer layer; a method for preparing the nanocrystal; and an electronic device comprising the nanocrystal. The nanocrystal described herein has a minimal number of surface defects, an improved luminescence capability, and an enhanced level of color purity.

2. Description of the Related Art

A nanocrystal is a single crystal particle having a cross-section of only a few nanometers, and consisting of several hundred to several thousand atoms. Since such a small-sized material has a large surface area per unit volume, most of the constituent atoms of the nanocrystal are present on the surface of the nanocrystal. As a result of this characteristic structure, a semiconductor nanocrystal is under the influence of quantum confinement effects, and thereby demonstrates electrical, magnetic, optical, chemical and mechanical properties that are substantially different from those inherent to the constituent atoms of the nanocrystal.

In other words, controlling the physical size and composition of the semiconductor nanocrystals enables control over the properties of the nanocrystals. Accordingly, semiconductor nanocrystals can be utilized in a variety of applications including: luminescent devices, for example, light-emitting diodes (LEDs), electroluminescence (EL) devices, lasers, holographic devices and sensors; and electronic devices, for example, solar cells and photodetectors.

Nanocrystals are generally prepared using wet chemistry methods wherein a precursor material is added to a coordinating organic solvent in order to grow the nanocrystals to an intended size. As the nanocrystals grow, the organic solvent is naturally coordinated to the surface of the nanocrystals, thereby acting as a dispersant. As such, the organic solvent facilitates the growth of the nanocrystals to a nanometer-scale level. The wet chemistry method has advantages in that nanocrystals of a variety of sizes can be uniformly prepared by appropriately controlling the concentration of the precursor materials used, the type of organic solvent used, as well as the preparation temperature and time.

A wide variety of different kinds of nanocrystals are known to date, and in general, Group II and Group VI compound semiconductors are the compounds most often used as nanocrystals. The Group II and VI compound semiconductor nanocrystals are easy to prepare, and they exhibit the desired optical properties, however they are problematic in that they contain heavy metals that fall under government environmental regulations. For these reasons, Group III and Group V semiconductor nanocrystals have been attracting a great deal of attention as potential replacements for the Group II and Group VI compound semiconductors.

Various methods to prepare nanocrystals, which are free of heavy metals, such as cadmium, mercury and lead, have been reported (*The Handbook of Nano-structured Materials and Nanotechnology*, Chapter 8; *Journal of Luminescence* 70 (1996) 70: 95-107; and U.S. Pat. No. 5,505,928). In addition, methods for synthesizing a core-shell nanocrystal structure are also known, wherein a crystal is grown on the surface of nanocrystals, and the crystal acts as a passivating shell in order to control the development of surface defects or, to employ quantum confinement effects with the purpose of improving the luminescence efficiency of the nanocrystals.

However, it is difficult to synthesize nanocrystals. In particular, the use of a wet chemical process, results in a precursor that has deteriorated reactivity, thereby making it difficult to grow the nanocrystals. Once synthesized, the nanocrystals are very poor in quality. Due to the small size of the nanocrystals, the presence of defects on the surface of the nanocrystals, results in the deterioration of the luminescence efficiency of the nanocrystals. In addition, it is also difficult to passivate a nanocrystal core with a shell layer. For this reason, there are technical limitations associated with the preparation of nanocrystals of high quality and superior luminescence efficiency. The reason for the difficulty in passivation is that a core-shell structured nanocrystal may involve non-uniform growth of the shell layer due to lattice mismatch between nanocrystals constituting the core and nanocrystals constituting the shell. Consequently, the interface between the core and the shell becomes unstable, thus disadvantageously causing deterioration in the luminescence and optical properties of the nanocrystal.

SUMMARY

In one embodiment, there is provided a nanocrystal comprising a semiconductor nanocrystal core, a non-semiconductor buffer layer surrounding the semiconductor nanocrystal core. In another embodiment, a nanocrystal is provided with significantly improved luminescence properties and color purity.

In yet another embodiment, a method for preparing the nanocrystal is provided.

In yet a further embodiment, an electronic device comprising the nanocrystal is provided.

According to one embodiment, the nanocrystal core comprises a Group III-V compound semiconductor. Specifically, the nanocrystal core comprises Group III-V semiconductors selected from the group consisting of AlN, AlP, AlAs, AlSb, GaN, GaP, GaAs, GaSb, InN, InP, InAs, InSb, TlN, TlP, TlAs, TlSb, and alloys, and a combination of at least one of the foregoing Group III-V compound semiconductors.

According to another embodiment, the buffer layer may be a chalcogen buffer layer. The chalcogen buffer layer comprises a chalcogen element selected from the group consisting of S, Se, Te, and a combination comprising at least one of the foregoing chalcogen elements.

According to yet another embodiment, the nanocrystal may further comprise at least one shell layer surrounding the buffer layer comprises compounds selected from the group consisting of Group II-VI compounds, Group II-V compounds, Group III-VI compounds, Group III-V compounds, Group IV-VI compounds, Group II-III-VI compounds, Group II-IV-VI compounds, Group II-IV-V compounds, and alloys, and a combination comprising at least one of the foregoing compound groups.

In accordance with one aspect, a method is provided for preparing a nanocrystal comprising: reacting a semiconductor precursor with a reaction system comprising a solvent and a dispersant to prepare a semiconductor nanocrystal core solution; adding a non-semiconductor precursor to the semiconductor nanocrystal core solution to form a non-semiconductor buffer layer on the surface of the nanocrystal core.

In accordance with another aspect, the method may additionally comprise forming at least one shell layer on the non-semiconductor buffer layer.

In accordance with yet another aspect, there is provided an electronic device comprising the nanocrystal.

BRIEF DESCRIPTION OF THE DRAWINGS

The aforementioned features and advantages of the present invention will be more clearly understood from the following detailed description taken in conjunction with the accompanying drawings, in which.

DESCRIPTION OF THE PREFERRED EMBODIMENTS

The present invention will now be described in greater detail.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one embodiment, the present invention provides a nanocrystal comprising a semiconductor nanocrystal core and a non-semiconductor buffer layer surrounding the semiconductor nanocrystal core.

Figure 1A:
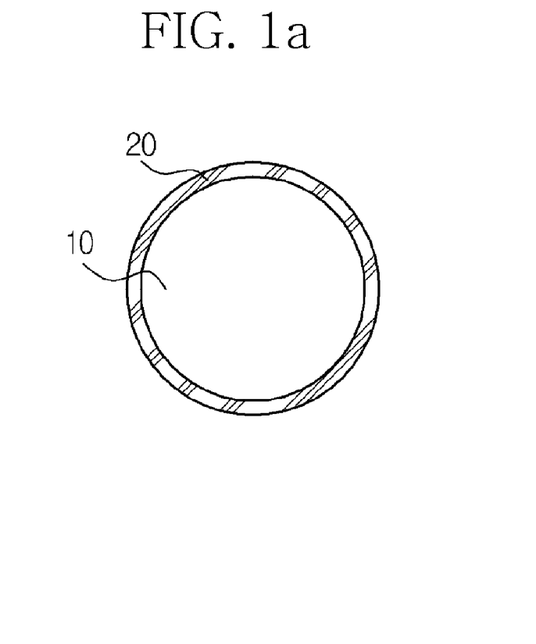
FIG. 1A is an exemplary schematic diagram illustrating the structure of a nanocrystal.

FIG. 1A is an exemplary schematic diagram showing the structure of a nanocrystal. As shown in FIG. 1A, the nanocrystal has a structure wherein a buffer layer 20 comprised of a non-semiconductor material, is formed around a nanocrystal core 10 comprised of a semiconductor material.

The buffer layer 20, is formed by passivating a non-semiconductor material on the surface of the nanocrystal core 10. The buffer layer 20 decreases the number of defects found on the surface of the nanocrystal, thereby improving the luminescence efficiency. In addition, since the buffer layer 20 reacts with a portion of the semiconductor metal element (e.g. Group III elements) it also functions as a passivation layer for preventing oxidation.

In another embodiment, the nanocrystal core 10 may comprise any semiconductor material, including for example, Group III-V semiconductor compounds. Non-limiting examples of Group III-V semiconductor compounds includes compounds selected from the group consisting of AlN, AlP, AlAs, AlSb, GaN, GaP, GaAs, GaSb, InN, InP, InAs, InSb, ThN, ThP, ThAs, ThSb, and alloys, and a combination comprising at least one of the foregoing III-V semiconductor compounds.

In yet another embodiment, the buffer layer 20 may be comprised of a chalcogen precursor. However, there are no limitations regarding the type of non-semiconductor material that can be used for the buffer layer 20. The chalcogen buffer layer may be comprised of a chalcogen element selected from the group consisting of sulfur (S), selenium (Se), tellurium (Te) and, a combination comprising at least one of the foregoing elements.

In one embodiment, the surface of the nanocrystal can be selectively coordinated to an organic material. The coordination of the nanocrystal surface to the organic material contributes to an improvement in nanocrystal dispersability and, aids in the prevention of aggregate formation between the nanocrystals. The organic layer (not shown) comprises a dispersant and solvent, both of which are used to facilitate the process of nanocrystal growth. Examples of the organic material include, but are not limited to, those selected from the group consisting of: $C_6$-$C_{22}$ alkanes and alkenes having a terminal carboxyl (COOH) group; $C_6$-$C_{22}$ alkanes and alkenes having a terminal phosphonic acid ($PO_3H_2$) group; $C_6$-$C_{22}$ alkanes and alkenes having a terminal phosphine oxide (PO) group; $C_6$-$C_{22}$ alkanes and alkenes having a terminal sulfhydryl (SOOH) group; and $C_6$-$C_{22}$ alkanes and alkenes having a terminal amino ($NH_2$) group; and a combination comprising at least one of the foregoing organic materials. Specifically, the organic material is selected from the group consisting ofoleic acid, stearic acid, palmitic acid, hexylphosphonic acid, n-octylphosphonic acid, tetradecylphosphonic acid, octadecylphosphonic acid, n-octyl amine, hexadecyl amine, and a combination comprising at least one of the foregoing organic materials.

Figure 1B:
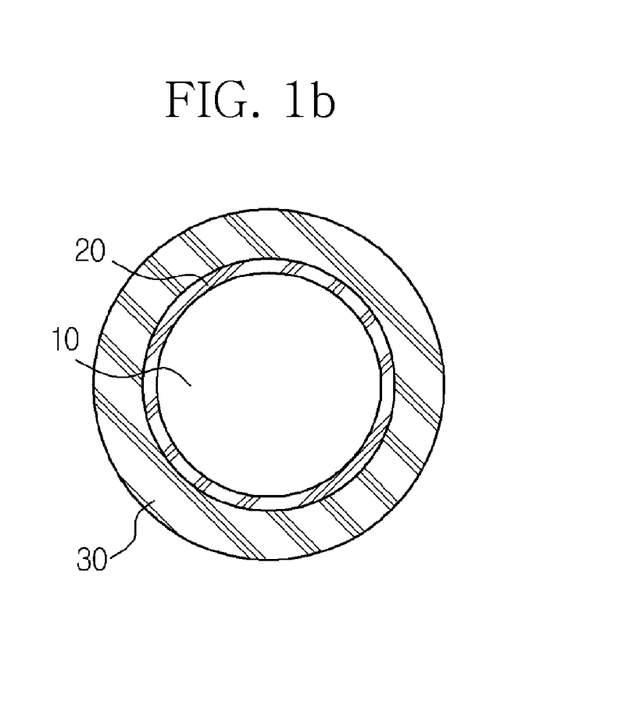
FIG. 1B is an exemplary schematic diagram illustrating a core-shell nanocrystal structure.

In another embodiment, the nanocrystal may comprise at least one shell layer on the chalcogen buffer layer. FIG. 1B is an exemplary schematic diagram showing the structure of the nanocrystal. As shown in FIG. 1B, the nanocrystal comprises a nanocrystal core 10, a chalcogen buffer layer 20 surrounding the nanocrystal core 10, and at least one shell layer 30 surrounding the buffer layer 20.

The chalcogen buffer layer 20 can be reacted with both Group III metal elements and Group II metal elements to form crystals, thereby reducing the lattice mismatch between the core and the shell, and allowing the shell to stably grow. Accordingly, interposition of the chalcogen buffer layer 20 between the nanocrystal core 10 and the nanocrystal shell layer 30, enables a reduction in the lattice mismatch between nanocrystals constituting the nanocrystal core 10 and nanocrystals constituting the nanocrystal shell layer 30, thereby minimizing the number of defects in the final core-shell structured nanocrystal. The reduction in nanocrystal defects provides improved crystallinity, and further enhances the luminescence efficiency and color purity of the nanocrystals.

According to one embodiment, the shell layer 30 comprises a compound selected from the group consisting of Group II-VI compounds, Group II-V compounds, Group III-VI compounds, Group III-V compounds, Group IV-VI compounds, Group II-III-VI compounds, Group II-IV-VI compounds, Group II-IV-V compounds, and alloys, and a combination comprising at least one of the foregoing compound groups. Specifically, the shell layer 30 is composed of a Group II-VI compound or a Group III-V compound.

More specifically, the shell layer comprises a compound selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, and alloys, and combinations comprising at least one of the foregoing compounds.

The nanocrystals of the nanocrystal-metal oxide complex may have various shapes depending on the reaction conditions. Specific examples of nanocrystal shapes include at least one selected from the group consisting of spheres, tetrahedrons, cylinders, rods, triangles, discs, tripods, tetrapods, cubes, boxes, stars, tubes, and a combination comprising one or more of the foregoing shapes. The nanocrystals are capable of efficiently absorbing or emitting light across a broad spectrum of wavelengths, comprising visible wavelengths as well as ultraviolet and infrared wavelengths.

Figure 2:
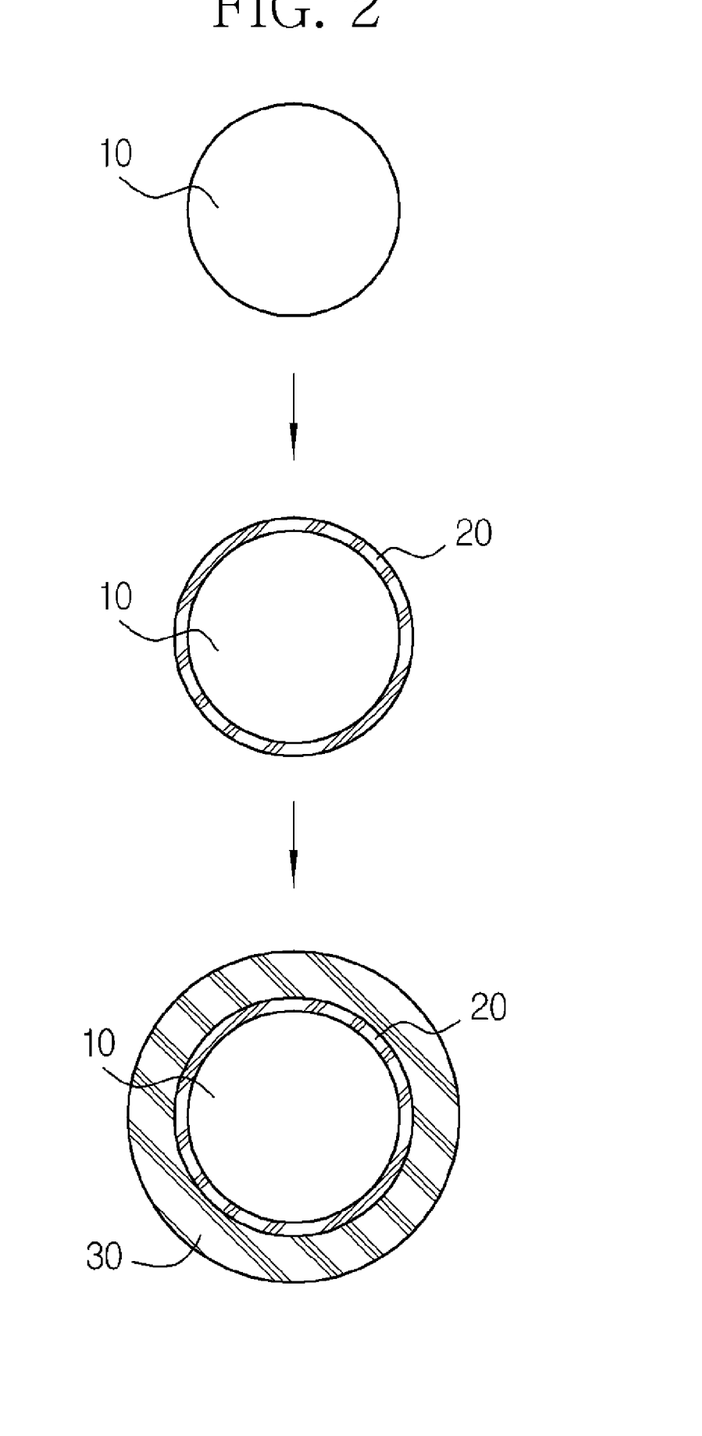
FIG. 2 is a schematic diagram illustrating a method for preparing a nanocrystal.

According to another embodiment, a method is provided for preparing a nanocrystal. FIG. 2 is an exemplary schematic diagram illustrating a method for preparing a nanocrystal.

According to the method described herein, a semiconductor precursor is first reacted with a reaction system comprising both a solvent and a dispersant, in order to prepare a semiconductor nanocrystal core 10. Then, a non-semiconductor precursor is added to the nanocrystal core to form a non-semiconductor buffer layer 20 on the surface of the core 10. The nanocrystal core may comprise a Group III-V semiconductor compound. To prepare such a nanocrystal core, a Group III or V element precursor may be used. Examples of Group III element precursors that can be used include precursors selected from the group consisting of aluminum phosphate, aluminum acetylacetonate, aluminum chloride, aluminum fluoride, aluminum oxide, aluminum nitrate, aluminum sulfate, gallium acetylacetonate, gallium chloride, gallium fluoride, gallium oxide, gallium nitrate, gallium sulfate, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, and a combination comprising at least one of the foregoing Group III element precursors.

Examples of Group V element precursors that can be used include precursors selected from the group consisting of trimethylsilyl phosphine, alkyl phosphines (e.g., triethylphosphine, tributylphosphine, trioctylphosphine, triphenylphosphine, and tricyclohexylphosphine), arsenic oxide, arsenic chloride, arsenic sulfate, arsenic bromide, arsenic iodide, nitric oxide, nitric acid, ammonium nitrate, and a combination comprising at least one of the foregoing Group V element precursors.

The non-semiconductor precursor for the buffer layer may be a chalcogen precursor. The chalcogen precursor may be a chalcogen element selected from the group consisting of sulfur (S), selenium (Se), tellurium (Te) and, a combination comprising at least one of the foregoing chalcogen elements; or a chalcogenide. Specific examples of the chalcogenide that can be used in the method of the present invention include chalcogenides selected from the group consisting of alkyl thiol compounds, (for example, hexane thiol, octane thiol, decane thiol, dodecane thiol, hexadecane thiol, and mercaptopropyl silane), sulfur-trioctylphosphine ("S-TOP"), sulfur-tributylphosphine ("S-TBP"), sulfur-triphenylphosphine (S-TPP), sulfur-trioctylamine ("S-TOA), trimethylsilyl sulfur, ammonium sulfide, sodium sulfide, selenium-trioctylphosphine ("Se-TOP), selenium-tributylphosphine ("Se-TBP"), selenium-triphenylphosphine ("Se-TPP"), tellurium-tributylphosphine ("Te-TBP"), tellurium-triphenylphosphine ("Te-TPP"), and a combination comprising at least one of the foregoing chalcogenides.

In one embodiment, at least one shell layer 30 is further formed on the chalocogen buffer layer 20 to prepare a core-shell structured nanocrystal.

The nanocrystals can be prepared using any process known in the art. For example, the nanocrystal is prepared by reacting a Group V or VI precursor within a mixed system comprising a solvent, and a dispersant containing a Group II, III, or IV precursor.

In another embodiment, an electronic device is provided, more particularly, an electroluminescent device comprising the Group III-V semiconductor nanocrystal. The Group III-V semiconductor nanocrystal can be utilized in a variety of electronic devices including one or more selected from the group consisting of display devices, for example, plasma display panels (PDPs) and luminescent diodes (LEDs), which necessarily include luminescent materials; electroluminescent devices which use nanocrystals as a light-emitting layer; sensors, for example, biosensors, which are reacted with target materials to emit light; photovoltaic devices; and a combination comprising at least one of the foregoing electronic devices.

In particular, since the nanocrystals can absorb and emit light across the entire spectrum of visible light wavelengths, the nanocrystal is useful for the production of a light-emitting layer in an organic/inorganic hybrid electroluminescent device. The introduction of the nanocrystal into the light-emitting layer can be carried out using common processes that are known in the art, including vapor deposition, sputtering, printing, coating and electron beam processes. The nanocrystal light-emitting layer preferably has a thickness of about 50 to about 100 nm.

As described herein, an electroluminescent device may broadly include all devices capable of converting electrical energy into light energy. Since the nanocrystals possess the advantages of high quantum efficiency, superior color purity, and the ability to control the band gap, they can be used as luminescent materials for various kinds of electroluminescent devices. Such an electroluminescent device may have various structures conventionally known in the art. Examples of the different types of structures include, but are not limited to, the group consisting of: anode/light-emitting layer/cathode, anode/buffer layer/light-emitting layer/cathode, anode/hole transport layer/light-emitting layer/cathode, anode/buffer layer/hole transport layer/light-emitting layer/cathode, anode/buffer layer/hole transport layer/light-emitting layer/electron transport layer/cathode, and anode/buffer layer/hole transport layer/light-emitting layer/hole blocking layer/cathode, and a combination of one or more of the foregoing structures.

Specifically, an example of an electroluminescent device is an organic/inorganic hybrid electroluminescent device that utilizes nanocrystals to emit light, wherein holes injected through a hole transport layer from a hole injecting electrode, are recombined with electrons injected through an electron transport layer from an electron injecting electrode. Such an organic/inorganic hybrid electroluminescent device comprises a substrate, a hole-injecting electrode, a hole transport layer, a light-emitting layer, an electron transport layer, and an electron-injecting electrode, laminated in this same order. The light-emitting layer may have a multishell nanocrystal structure. If necessary, a hole-blocking layer may be interposed between the light-emitting layer and the electron transport layer.

In addition, when semiconductor nanocrystals are used as phosphors for luminescent diodes (LEDs), they act as color converting materials capable of absorbing source light emitted from a diode, and further converting the source light into light of a specific, different wavelength. Nanocrystals also possess optical gain properties, in that they are able to amplify light as it is produced, thereby enabling their use for the generation of superior laser properties. The nanocrystals described herein exhibit superior stability and high luminescence efficiency. Accordingly, when the nanocrystals are utilized in an electroluminescent device, the device demonstrates superior characteristics, as compared to those comprised of other structured nanocrystals.

The substrate used is not particularly limited so long as it is one commonly used in the art. Specifically, the use of a transparent substrate provides high transparency, superior surface smoothness, ease of handling and excellent waterproofness. Specific examples transparent substrates include those selected from the group consisting of transparent inorganic substrates, such as quartz and glass, and transparent plastic substrates, such as polyethylene terephthalate ("PET"), polyethylene naphthalate ("PEN"), polycarbonate, polystyrene, polypropylene, polymethylmethacrylate, polyethersulfone ("PES") and the like; and a combination comprising at least one of the foregoing transparent substrates.

Materials for the hole-injecting electrode may be electrically conductive metals or their oxides. Specific examples of conductive metals or metal oxides include those selected from the group consisting of indium tin oxide ("ITO"), indium zinc oxide ("IZO"), nickel (Ni), platinum (Pt), gold (Au), silver (Ag), iridium (Ir), and a combination comprising at least one of the foregoing transparent substrates.

Materials for the hole transport layer are not particularly limited so long as they are commonly used in the art. Specific examples of hole transport materials include those selected from the group consisting of poly(3,4-ethylenedioxythiophene)/polystyrene ("PEDOT"/"PSS") derivatives, poly-N-vinylcarbazole derivatives, polyphenylenevinylene derivatives, polyparaphenylene derivatives, polymethacrylate derivatives, poly(9,9-octylfluorene) derivatives, poly (spiro-fluorene) derivatives, N,N'-diphenyl-N,N'-bis(3-methylphenyl)-(1,1'-biphenyl)-4,4'-diamine ("TPD"), and a combination comprising at least one of the foregoing hole transport materials. The thickness of the hole transport layer is preferably between about 10 nm to about 100 nm.

The materials for the electron transport layer may be a material commonly used in the art. Examples of materials for the electron transport layer include, those selected from the group consisting of oxazoles, isooxazoles, triazoles, isothiazoles, oxydiazoles, thiadiazoles, perylenes, and aluminum complexes, including tris(8-hydroxyquinoline)-aluminum ($Alq_3$), bis(2-methyl-8-quinolinatho)(p-phenyl-phenolato) aluminum (Balq), bis(2-methyl-8-quinolinato)(triphenylsiloxy) aluminum (III) (Salq), and a combination comprising at least one of the foregoing electron transport materials. The thickness of the electron transport layer is preferably between about 10 nm to about 100 nm.

As materials for the electron-injecting electrode, low-work function metals may be used, allowing for the easy injection of electrons. Specific examples of the metals include those selected from the group consisting of I, Ca, Ba, Ca/Al, LiF/Ca, LiF/Al, $BaF_2$/Al, $BaF_2$/Ca/Al, Al, Mg, and Ag:Mg alloys, and a combination comprising at least one of the foregoing metals. The thickness of the electron injecting electrode is preferably in the range of about 50 nm to about 300 nm.

Materials which may be used for the hole blocking layer are not particularly limited so long as they are commonly used in the art. Specific examples of hole blocking layer materials include those selected from the group consisting of triazoles, for example, 3-phenyl-4-(1'-naphthyl)-5-phenyl-1,2,4-triazole ("TAZ"), phenanthrolines, for example, 2,9-dimethyl-1,10-phenanthroline ("BCP"), imidazoles, oxadiazoles, aluminum complexes, and a combination comprising at least one of the hole blocking layer materials. The thickness of the hole blocking layer is preferably in the range of about 5 nm to about 50 nm.

In addition to the aforementioned devices, the nanocrystals can be also applied to nanobiosensors, nanobiochips, and the like.

Hereinafter, the present invention will be explained in more detail with reference to the following examples. However, these examples are given for the purpose of illustration and are not to be construed as limiting the scope of the invention.

EXAMPLES

Preparation Example

Synthesis of an InP nanocrystal core

Indium acetate (0.058 g, 0.2 mmol) and oleic acid (0.118 g, 0.6 mmol) were dissolved in 10 g of octadecene (ODE) to prepare an indium precursor solution. The indium precursor solution was heated at about 120° C. until it became clear. The indium precursor solution was allowed to react under vacuum for about 90 min. The solution was then washed three times with nitrogen and heated to about 300° C. under a nitrogen atmosphere. Separately, 0.1 mmol of tris-((trimethylsilyl) phosphine) was dissolved in 2 g of ODE to prepare a phosphine precursor solution. The phosphine precursor solution was added all at once to the reaction mixture being heated at about 300° C. After about a 20° C. or greater drop in temperature, the reaction mixture was cooled to about 270° C. and allowed to react for an additional 2 hours in order to produce an indium phosphate (InP) nanocrystal core.

Figure 3A:
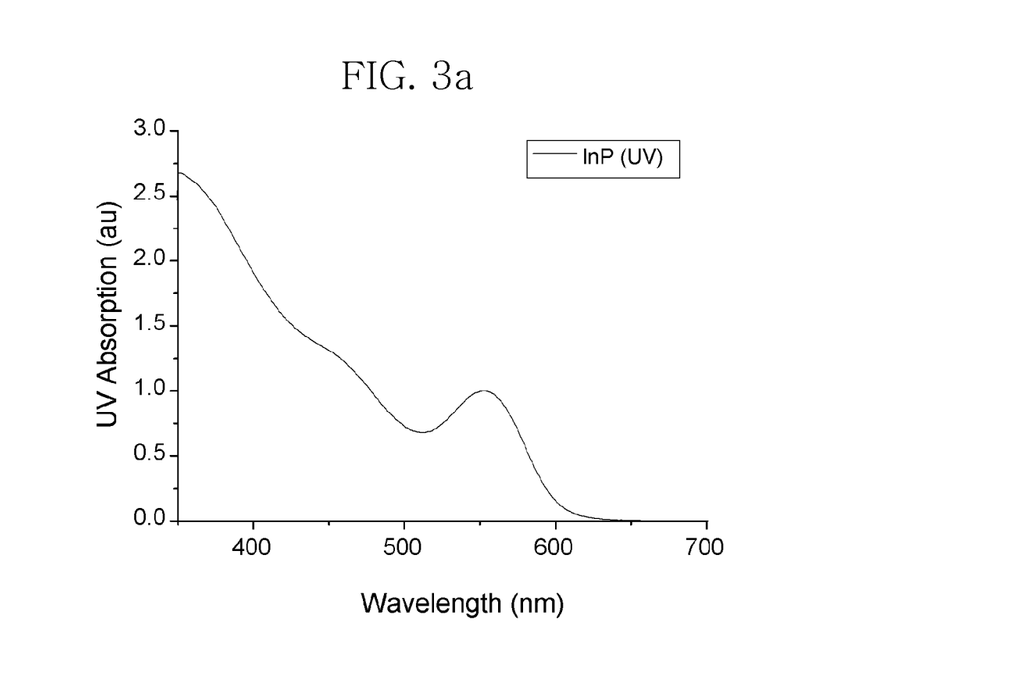
FIG. 3A is a graph showing the UV absorbance for the nanocrystal core prepared as described in the Preparation Example.
Figure 3B:
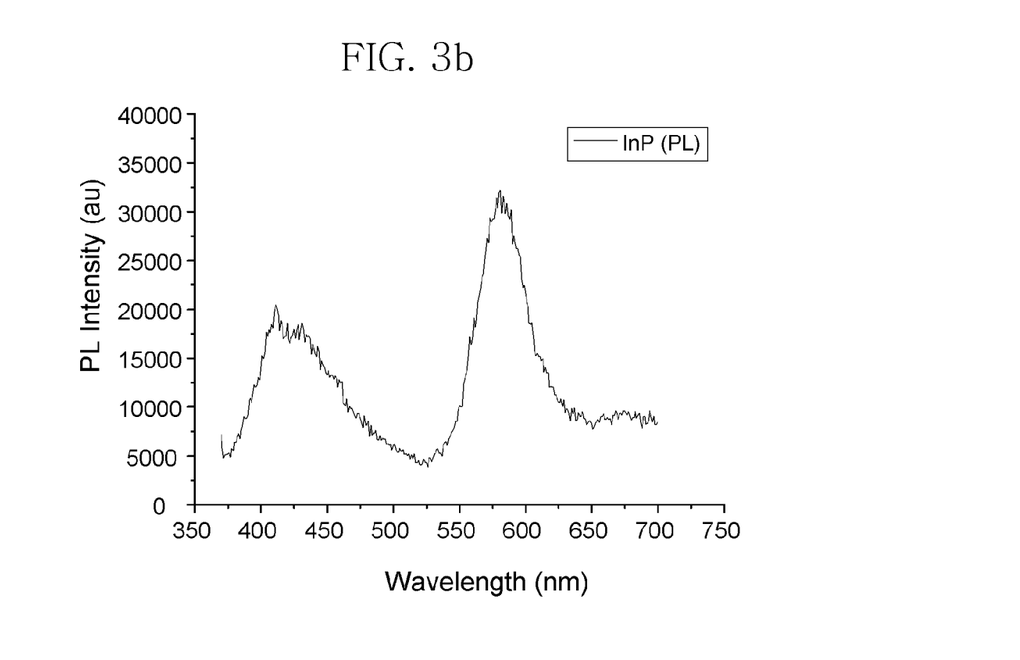
FIG. 3B is the photoluminescent spectrum for the same nanocrystal core.

FIG. 3A is a graph showing the UV absorbance for the InP nanocrystal core, and FIG. 3B is the photoluminescent spectrum for the InP nanocrystal core. As shown in FIG. 3B, the nanocrystal core exhibits poor luminescence properties and its luminescence efficiency is below 1%. This indicates that the surface defects on the nanocrystal core are serious and, that oxides have been created on the surface of the nanocrystal core.

Example 1

Synthesis of an InP/Se/ZnS Nanocrystal

Indium acetate (0.07 mmol) and oleic acid (0.3 mmol) were mixed with 10 g of octadecene (ODE) followed by stirring under vacuum at a temperature of about 120° C. Next, 0.05 mmol of tris-((trimethylsilyl) phosphine) and 1 mL of ODE were fed to the mixture and heated at about 250° C. The reaction mixture was allowed to react for about 20 min. After completion of the reaction, a Se-Top solution (0.1 M, 0.02 mL) was added to the reaction mixture and allowed to react for about 30 min. Then, a solution containing 0.2 mmol Zn—OA was fed to the resulting mixture and allowed to react with stirring for about one hour. After the reaction temperature was elevated to about 300° C., an S-TOP (0.4 M, 1 mL) was fed to the mixture and allowed to react for about one hour to yield an InP/Se/ZnS nanocrystal.

Figure 4A:
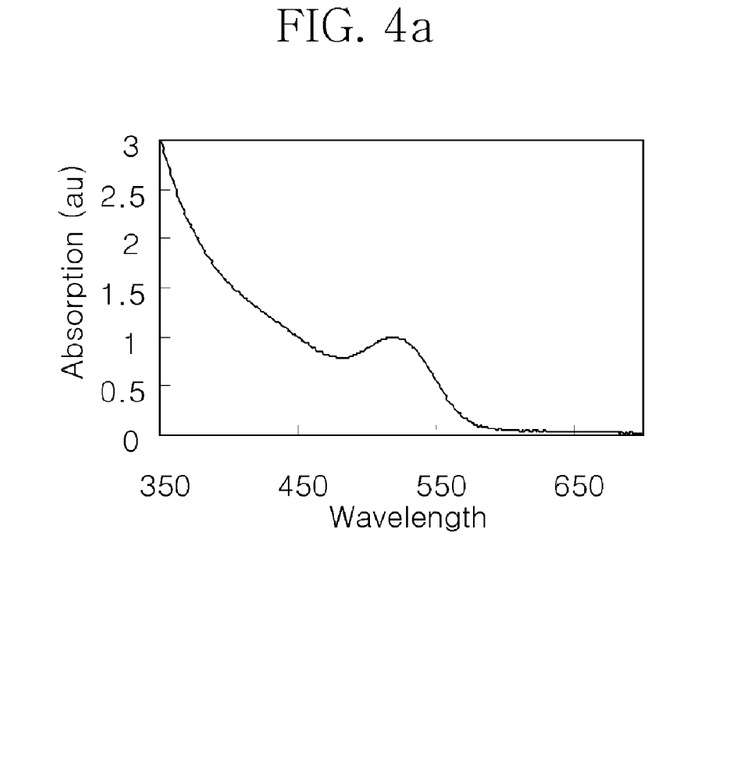
FIG. 4A is the UV-Vis absorption spectrum for the nanocrystal prepared as described in Example 1.
Figure 4B:
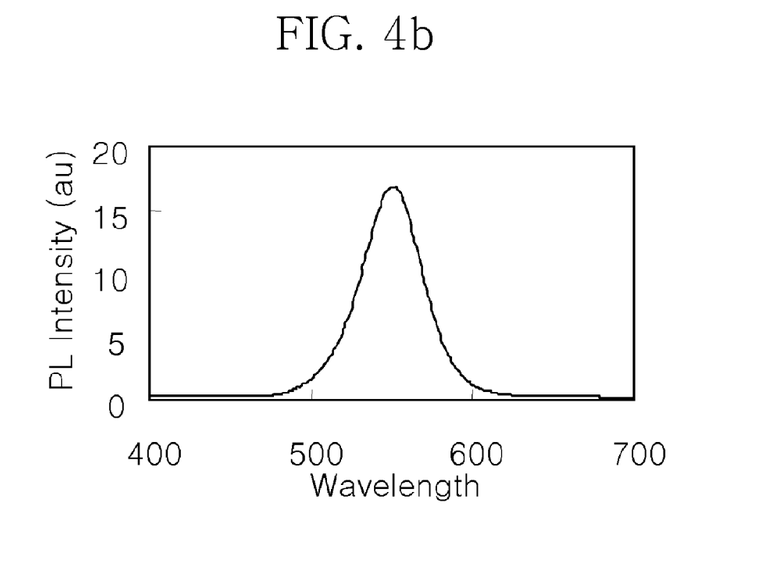
FIG. 4B is the photoluminescent spectrum for the same nanocrystal.

FIG. 4A shows the UV-Vis absorption spectrum for the InP/Se/SnS nanocrystal, and FIG. 4B shows the photoluminescence spectrum for the InP/Se/ZnS nanocrystal. In addition, the quantum efficiency of the InP/Se/ZnS nanocrystal was determined to be about 45% and the half-band width of the photoluminescence spectrum was about 45 nm.

Comparative Example 1

Synthesis of an InP/ZnS nanocrystal

Indium acetate (0.1 mmol) and oleic acid (0.3 mmol) were mixed with 10 g of octadecene (ODE) followed by stirring under vacuum to about 120° C. Next, 0.05 mmol of tris-((trimethylsilyl) phosphine) and 1 mL of ODE were added to the mixture and heated at about 250° C. The reaction mixture was allowed to react for about 20 min. About 20 minutes, a 0.2 mmol Zn—OA solution was added to the reaction mixture and, after the reaction temperature was elevated to about 300° C., a S-TOP solution (0.4 M, 1 mL) was fed to the mixture and allowed to react for about 30 min to yield an InP/ZnS nanocrystal.

Figure 5A:
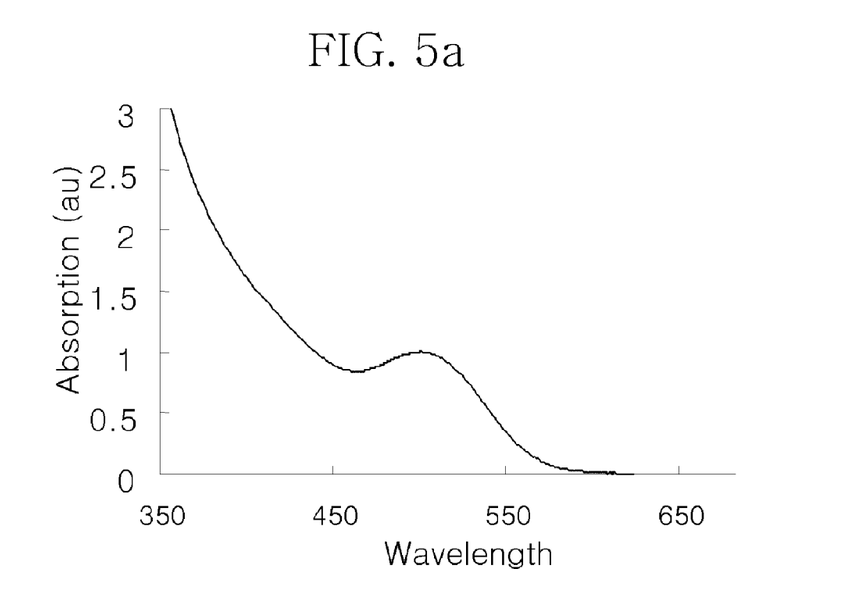
FIG. 5A is the UV-Vis absorption spectrum for the nanocrystal prepared as described in Comparative Example 1.
Figure 5B:
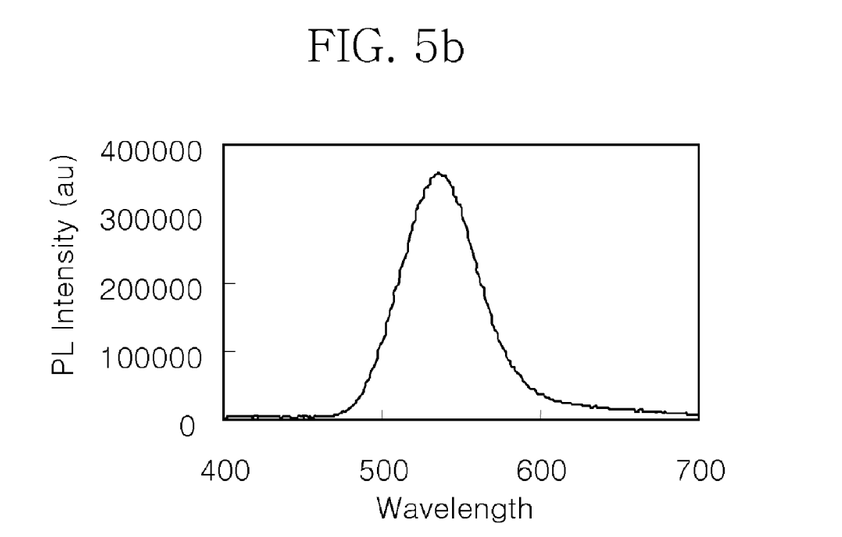
FIG. 5B is the photoluminescent spectrum for the same nanocrystal.

FIG. 5A shows the UV-Vis absorption for the InP/ZnS nanocrystal and, FIG. 5B shows the photoluminescence spectrum for the InP/ZnS nanocrystal. In addition, the quantum efficiency of the InP/Se/SnS nanocrystal was determined to be about 26% and, the half-band width of the photoluminescence spectrum was about 57 nm.

Example 2

Synthesis of an InP/S/ZnS Nanocrystal

Figure 6:
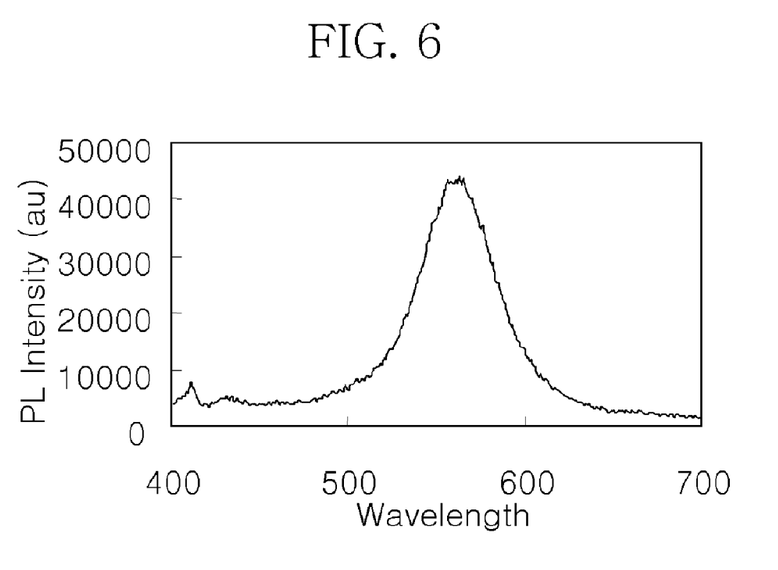
FIG. 6 is the photoluminescent spectrum for the nanocrystal prepared as described in Example 2.

Indium acetate (0.07 mmol) and oleic acid (0.3 mmol) were mixed with 10 g of octadecene (ODE) followed by stirring under vacuum to about 120° C. Next, 0.05 mmol of tris-((trimethylsilyl) phosphine) and 1 mL of ODE were fed to the mixture and heated at about 250° C. The reaction mixture was allowed to react for about 20 min. After completion of the reaction, a S-Top solution (0.1 M, 0.02 mL) was added to the reaction mixture and allowed to react for about 30 min. After a solution containing 0.2 mmol Zn—OA was fed to the resulting mixture, the mixture was allowed to react for about 30 min while the reaction temperature was elevated to about 300° C. Next, 1 mL of 0.4M Se/TOP was fed to the reaction mixture and allowed to react for about one hour to yield an InP/S/ZnS nanocrystal. FIG. 6 shows the photoluminescence spectrum for the InP/S/ZnS nanocrystal. The quantum efficiency of the InP/S/ZnS nanocrystal was determined to be about 41% and the half-band width of the photoluminescence spectrum was about 43 nm.

Example 3

Synthesis of InP/S+Se/ZnS Nanocrystal

Figure 7:
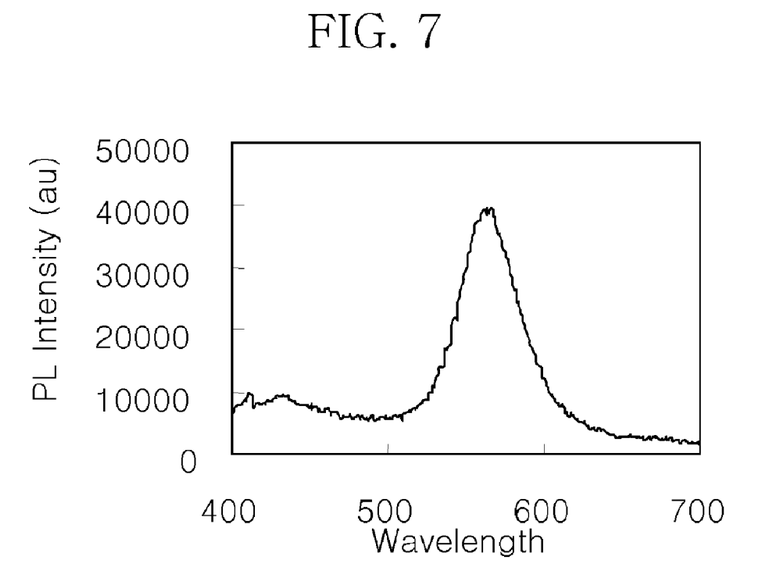
FIG. 7 is the photoluminescent spectrum for the nanocrystal prepared as described in Example 3.

Indium acetate (0.07 mmol) and oleic acid (0.3 mmol) were mixed with 10 g of octadecene (ODE) followed by stirring under vacuum to about 120° C. Next, 0.05 mmol of tris-((trimethylsilyl) phosphine) and 1 mL of ODE were fed to the mixture and heated at about 250° C. The reaction mixture was allowed to react for about 20 min. After completion of the reaction, a mixture of a S-TOP solution (0.1 M, 0.01 mL) and a Se-TOP solution (0.1 M, 0.01 mL) was added to the reaction mixture and allowed to react for about 30 min. After a solution of 0.2 mmol Zn—OA was fed to the resulting mixture, the mixture was allowed to react for about 30 min while the reaction temperature was elevated to about 300° C. Next, 1 mL of 0.4M Se/TOP solution was fed to the reaction mixture and allowed to react for one hour to yield an InP/S+Se/ZnS nanocrystal. FIG. 7 shows the photoluminescence spectrum for the InP/S+Se/ZnS nanocrystal. The quantum efficiency of the InP/S+Se/ZnS nanocrystal was about 39% and, the half-band width of the photoluminescence spectrum was about 45 nm.

As is apparent from the foregoing examples, the nanocrystal described herein comprises a chalcogen buffer layer surrounding a nanocrystal core. The chalcogen buffer layer reduces the defects found on the surface of the nanocrystal, and acts as a passivation layer for preventing oxidation, thereby improving the luminescence efficiency and color purity of the nanocrystal.

According to one embodiment, since the chalcogen buffer layer is interposed between the nanocrystal core and the nanocrystal shell, it is capable of reacting with both the metal from the nanocrystal core and the metal from the nanocrystal shell to form crystals, thus reducing the level of lattice mismatch at the interface between the core and the shell. As a result, it is possible to produce nanocrystals with minimal defects, improved crystallinity, uniform growth of the shell layer, and enhanced luminescence efficiency and color purity.

The nanocrystals described herein are advantageously free of heavy metals, thereby making them environmentally friendly.

Since the nanocrystals exhibit superior stability and high luminescence efficiency, they demonstrate superior characteristics as compared to other nanocrystals.

Reference throughout the specification to "one embodiment", "another embodiment", "an embodiment", and so forth, means that a particular element (e.g. feature, structure, and/or characteristic) described in connection with the embodiment is included in at least one embodiment described herein, and may or may not be present in other embodiments.

In addition, it is to be understood that the described elements may be combined in any suitable manner in the various embodiments.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nanocrystal comprising: a semiconductor nanocrystal core;
   a non-semiconductor buffer layer surrounding the semiconductor nanocrystal core; and
   a shell layer surrounding the buffer layer; wherein the non-semiconductor is a chalcogen buffer layer, and the shell layer comprises a semiconductor nanocrystal.

2. The nanocrystal of claim 1, wherein the semiconductor nanocrystal core comprises a Group III-V semiconductor compound.

3. The nanocrystal of claim 2, wherein the semiconductor nanocrystal core comprises a Group III-V semiconductor compound selected from the group consisting of GaN, GaP, GaAs, InP, InAs, InSb, and alloys, and a combination comprising at least one of the foregoing Group III-V semiconductor compounds.

4. The nanocrystal of claim 1, wherein the chalcogen buffer layer comprises:
   a chalcogen element selected from S, Se, Te or, a combination comprising at least one of the foregoing chalcogen elements; or
   a chalcogenide.

5. The nanocrystal of claim 1, wherein the surface of the semiconductor nanocrystal core is coordinated to an organic material.

6. The nanocrystal of claim 1, wherein the shell layer comprises compounds selected from the group consisting of Group II-VI compounds, Group II-V compounds, Group III-VI compounds, Group III-V compounds, Group IV-VI compounds, Group II-III-VI compounds, Group II-IV-VI compounds, Group II-IV-V compounds, and alloys, and a combination comprising at least one of the foregoing compound groups.

7. The nanocrystal of claim 6, wherein the shell layer comprises a Group II-VI or a Group III-V compound.

8. The nanocrystal of claim 6, wherein the shell layer comprises compounds selected from the group consisting of ZnS, ZnSe, ZnTe, CdS, CdSe, CdTe, HgS, HgSe, HgTe, GaN, GaP, GaAs, GaSb, GaSe, InN, InP, InAs, InSb, and alloys, and a combination comprising at least one of the foregoing compounds.

9. An electronic device comprising the nanocrystal of claim 1.

10. The electronic of claim 9, wherein the electronic device is selected from the group consisting of displays, lasers, linear photodiodes, sensors, photovoltaic devices, and a combination comprising at least one of the foregoing electronic devices.

11. A method for preparing a nanocrystal comprising:
    reacting a semiconductor precursor with a reaction system comprising a solvent and a dispersant to prepare a semiconductor nanocrystal core solution;
    adding a non-semiconductor precursor to the semiconductor nanocrystal core solution to form a non-semiconductor buffer layer on the surface of the semiconductor nanocrystal core; and
    disposing a shell layer to surround the non-semiconductor buffer layer; where the shell layer comprises a semiconductor nanocrystal; wherein the non-semiconductor precursor is a chalcogen precursor or a chalcogenide.

12. The method of claim 11, wherein the semiconductor precursor is a Group III or Group V element precursor.

13. The method of claim 12, wherein the Group III element precursor is selected from the group consisting of aluminum phosphate, aluminum acetylacetonate, aluminum chloride, aluminum fluoride, aluminum oxide, aluminum nitrate, aluminum sulfate, gallium acetylacetonate, gallium chloride, gallium fluoride, gallium oxide, gallium nitrate, gallium sulfate, indium chloride, indium oxide, indium nitrate, indium sulfate, thallium acetate, thallium acetylacetonate, thallium chloride, thallium oxide, thallium ethoxide, thallium nitrate, thallium sulfate, and thallium carbonate, and a combination comprising at least one of the foregoing Group III element precursors.

14. The method of claim 12, wherein the Group V element precursor is selected from the group consisting of: trimethylsilyl phosphine; alkyl phosphines including triethylphosphine, tributylphosphine, trioctylphosphine, triphenylphosphine, and tricyclohexylphosphine; arsenic oxide; arsenic chloride; arsenic sulfate; arsenic bromide; arsenic iodide; nitrous oxide; nitric acid, and ammonium nitrate; and a combination comprising at least one of the foregoing Group V precursors.

15. The method of claim 11, wherein the chalcogen precursor is selected from the group consisting of: chalcogen elements including sulfur (S), selenium (Se), tellurium (Te), and a combination comprising at least of the foregoing chalcogen precursors.

16. The method of claim 11, wherein the chalcogenide is selected from the group consisting of alkyl thiol compounds including hexane thiol, octane thiol, decane thiol, dodecane thiol, hexadecane thiol and mercaptopropyl silane; sulfur-trioctylphosphine; sulfur-tributylphosphine; sulfur-triphenylphosphine; sulfur-trioctylamine; trimethylsilyl sulfur; ammonium sulfide; sodium sulfide; selenium-trioctylphosphine; selenium-tributylphosphine; selenium-triphenylphosphine; tellurium-tributylphosphine; tellurium-triphenylphosphine; and a combination comprising at least one of the forgoing chalcogenides.

17. The method of claim 11, wherein the shell layer comprises a compound selected from the group consisting of Group II-VI compounds, Group II-V compounds, Group III-VI compounds, Group III-V compounds, Group IV-VI compounds, Group II-III-VI compounds, Group II-IV-VI compounds, Group II-IV-V compounds, and alloys, and a combination comprising a compound from at least one of the foregoing compound groups.

18. The method according to claim 17, wherein the shell layer comprises a Group II-VI or Group III-V compound.

19. The method of claim 17, wherein the shell layer comprises a compound selected from the group consisting of ZnS, ZnSe, ZnTe, CdS, CdSe, CdTe, HgS, HgSe, HgTe, AN, AlP, AlAs, AlSb, GaN, GaP, GaAs, GaSb, GaSe, InN, InP, InAs, InSb, and alloys, and a combination comprising at least one of the foregoing compounds.

* * * * *